United States Patent [19]

Lee et al.

[11] Patent Number: 5,281,670
[45] Date of Patent: Jan. 25, 1994

[54] POLYOLEFIN COMPOSITIONS

[75] Inventors: Robert W. Lee; Meredith S. Ott; Cesar O. Castro, all of Houston, Tex.

[73] Assignee: Shell Oil Company, Houston, Tex.

[21] Appl. No.: 969,653

[22] Filed: Oct. 30, 1992

[51] Int. Cl.$^5$ ............................................. C08L 35/00
[52] U.S. Cl. ...................................... 525/207; 525/98; 525/99; 525/221; 525/240; 524/528
[58] Field of Search ................... 525/98, 99, 207, 221, 525/240; 524/528

[56] References Cited

U.S. PATENT DOCUMENTS 4,960,820 10/1990 Hwo .
5,104,733 4/1992 Kasakevich et al. .
5,106,917 4/1992 Lee et al. ............................ 525/229

OTHER PUBLICATIONS

Product Bulletin, POLYBOND ® Chemically Modified Polyolefins, Oct. 1989.

*Primary Examiner*—Paul R. Michl
*Assistant Examiner*—U. K. Rajguru
*Attorney, Agent, or Firm*—James O. Okorafor

[57] ABSTRACT

It is herein provided a polymer blend comprising of polybutylene and a functionalized polyolefin such as maleated polypropylene. The blend has and exhibits an unexpectedly high degree of adhesion to polar polymers and metal surfaces, and enhances the use of polybutylene in applications for which adhesion to polar surfaces is required.

14 Claims, No Drawings

POLYOLEFIN COMPOSITIONS

FIELD OF THE INVENTION

This invention generally relates to polyolefin compositions. More particularly, this invention relates to a polyolefin-based adhesive material.

BACKGROUND OF THE INVENTION

Polyolefins including polybutylene and polypropylene are very well known in the art. It is known that polybutylene is non-polar, and exhibits little or no adhesion to substrates such as metals, and to polar polymers such as nylon, and PET. Attempts to improve on the adhesion of polybutylene to polar substrates by utilizing application methods inclusive of powder coating, lamination, co-extrusion, have been unsuccessful.

For some applications of polybutylene wherein the polybutylene is used to provide a protective coating for polar surfaces, e.g. metal surfaces, good adhesion of polybutylene to the polar surface is required. A conventional method of improving the adhesion of polybutylene to such polar surfaces by using an adhesive tie-layer or a liquid primer in between the polybutylene and the polar surface. Such tie-layers or primers include maleated KRATON®, ethylene acid copolymer such as ethylene acrylic acid or ethylene methacrylic acid copolymers, epoxy resins, and polyurethane. Conventional methods for inserting the tie-layer or applying the primer known in the art, can be utilized. The drawbacks of these tie-layer and primer methods include the requirement of additional materials, and an increase in costs.

Because of the present and increasing need of polybutylene in adhesive applications, it remains desirable to discover methods and/or materials which have the capability of improving upon the adhesive quality of polybutylene. The present invention represents one such discovery.

SUMMARY OF THE INVENTION

It is a general object of this invention to provide polyolefins-based adhesive materials.

It is a further object of this invention to provide a polybutylene blend having and exhibiting improved adhesion.

Accordingly, it is now provided a blend of polybutylene and functionalized polyolefin having and exhibiting excellent adhesion to metal substrates and to polar polymers.

DETAILED DESCRIPTION OF THE INVENTION

Generally speaking, the materials and equipment which are useful in the practice of this invention include polybutylene, functionalized polyolefins, and a compounding device such as a single screw extruder, and a pelletizer.

The useful polybutene-1 homo- or copolymer can be isotactic, elastomeric, syndiotactic, or it can have any characteristic that is known or expected of polybutene-1. These polybutene-1 polymers have a melt flow measured by ASTM D1238 Condition "L" at 230° C. in the range of from about 0.5 to 500, g/10 min, with a preferred range of from about 2 to 400 g/10 min. These polybutene-1 polymers, including their methods of preparation, and their properties are known in the art. An exemplary reference containing additional information on polybutylene is U.S. Pat. No. 4,960,820 which is herein incorporated by reference.

It is well known in the art that polyolefins can be functionalized by reacting with functional groups, such as, maleic anhydride. Examples of such functionalized polyolefins include maleated polybutylene, maleated polyethylene, and maleated polypropylene. One reason for functionalizing polyolefins is to increase or enhance its adhesion to polar polymers and metal substrates. Functionalized polyolefins, thus have and exhibit superior adhesive properties to non-functionalized polyolefins.

Because of this property of enhanced adhesive capability, all functionalized polyolefins are useful in the practice of this invention. The preferred functionalized polyolefin, is maleic anhydride functionalized polypropylene. Maleic anhydride functionalized polypropylene is commercially available from BP Performance Polymers Inc. under the tradename POLYBOND®. The specific properties of POLYBOND® such as melt flow rate, density, mechanical and thermal properties can be found in generally available product literature. One example of such literature is POLYBOND technical data sheet published by supplier, which is herein incorporated by reference. In spite of the improvement in adhesive capability, when polyolefins are functionalized, they become stiffer and more brittle, due to a self-nucleating effect, resulting in a higher shrinkage or warpage as the functionalized parts solidify from the molten state. The effect of this is that the plastic parts (functionalized polyolefin) pull away from the polar or metal surface resulting in bonding failure.

Blending a non-adhesive material such as a neat polyolefin with a functionalized polyolefin is expected to dilute the adhesive ability of the functionalized polyolefin. Stated differently, the blend is expected to be less adhering to polar polymers and metal substrates than the undiluted functionalized polyolefin. This can simply be explained by the fact that the non-adhesive material is expected to negatively impact or subtract from the adhesive capability of the functionalized polyolefin. Consistent with this teaching and/or expectation of the prior art, a blend of a non-adhesive material, such as polybutylene, with a functionalized polyolefin, such as maleic anhydride polypropylene, is expected to have and to exhibit inferior adhesive capability to polar polymers and metal substrates to the pure maleic anhydride grafted polypropylene.

However, contrary to the teachings and/or expectations therefrom of the prior art, it is a finding of the instant invention that blending polybutylene with functionalized polyolefins, e.g. maleated polypropylene (MAH-PP) results in a blend which is ductile and elastic, and which has and exhibits an unexpectedly higher degree of adhesion to metal surfaces and polar polymers.

In the polybutylene-MAH-polypropylene blend, the MAH-polypropylene is generally present in an amount of from about 1-70 wt %, preferably 5-50 wt % of the total blend. This blend enhances the use of polybutylene in applications wherein polybutylene is required to protect metal surfaces from corrosion. Examples of such uses include water heater vessel liners, corrosive resistant coatings, metal panel sealants, and packaging applications.

Commercial applications of the inventive blend include extrusion coating onto metal surfaces, e.g. aluminum foil, or polar polymers, such as nylon, PET, and polycarbonates, laminating films made from the blend onto metal and polymer surfaces, utilizing the blend in insert injection molding, and utilizing finely ground powders of the blend in rotation molding, fluidized bed powder coating, and flame spray coating.

The inventive blend can be made by any of the conventional blending processes known in the art. These processes generally include the following steps: tumbling a pre-weighed amount of the polybutylene and functionalized polyolefin in a mixer, feeding the mixture into a melt mixing device such as a Brabender mixer, or a continuous single-screw or twin-screw extruder, and discharging the molten (blend) material from the mixing device through a strand die into a cooling media or device. For film cast process or extrusion coating process, the strand die can be replaced with, for example, a slit die. These polymer strands can then be cut into pellets for down stream processing such as injection molding, or the pellets can be ground into powder for fluidized bed powder coating or flame spray coating.

This invention is further illustrated by the following examples. cl EXAMPLES

The following blends were prepared according to the procedure disclosed herein:
1. 100%* Polybond 3002
2. 50% Polybond 3002 + 50% PB 0300
3. 50% Polybond 3002 + 50% PB 8340
4. 50% Polybond 3002 + 50% PB DP8310
*Percents are in wt %.

Two hundred (200) grams of each formulation was prepared in the Brabender mixer at 200° C. and 100 RPM mixing speed. Each sample was dry blended, then placed in the mixer and melt blended for 3 minutes under nitrogen after all of the pellets had been added. The blends were cooled and pressed into 0.8 mm sheets in the Wabash press at 204° C. The sheets were pressed for 2 minutes with the back-up plates touching the platens, then the pressure was raised to 20 tons and held for 2 minutes. The sheet was moved to the 18° C. platens for 2 minutes cooling at 5 tons.

Four days after blending, the sheets were heat sealed to aluminum and steel at 191°, 204°, 218° C., 414 KPa, and 10 seconds seal time. The sealed pieces were aged 10 days to allow the polybutylene to transform to its most stable crystalline form, Form I. They were then cut into 25.4 mm strips and tested at 180° peel with an Instron testing machine using the procedure of ASTM D1876. The seal strength in gm/15 mm of the blends is summarized in Table I.

TABLE I

| Sample No. | Formulation | Seal Temp. °C. | Aluminum Max Load | Aluminum Type Failure | Steel Max Load | Steel Type Failure |
|---|---|---|---|---|---|---|
| 1 | Polybond 3002 | 191 | 327 | peel | | no seal[1] |
|  |  | 204 | 450 | peel | | no seal |
|  |  | 218 | 461 | peel | 249 | peel |
| 2 | 1:1 Polybond 3002: PB0300 | 191 | 732 | peel | 3028 | peel[2] |
|  |  | 204 | 866 | peel | 2927 | p & t |
|  |  | 218 | 1353 | peel | 4240 | p & t |
| 3 | 1:1 Polybond 3002: PB8340 | 191 | 726 | peel | 5617 | p & t[3] |
|  |  | 204 | 1404 | peel | 5071 | p & t |
|  |  | 218 | 1621 | peel | 4899 | p & t |
| 4 | 1:1 Polybond 3002: DP8310 | 191 | 1147 | peel | 3607 | peel |
|  |  | 204 | 1603 | peel | 3768 | peel |
|  |  | 218 | 1552 | peel | 3092 | peel |

[1] No seal means that the adhesion was too low to have a significant peel reading/
[2] Peel means the adhesion was sufficient to obtain a peel strength reading.
[3] p & t means the peel strength was so strong that the polymer sheet was partially torn during peel testing.
PB0300 is a homopolymer of butene-1
PB8340 is a copolymer of polybutylene and a low ethylene polymer.
DP8310 is a copolymer of polybutylene and a high ethylene polymer.

The reported values in Table I represent the average of five tests. The 100% Polybond 3002 (Sample No. 1) appeared to seal well initially; but as it cooled, it shrunk and became brittle, and eventually pulled away from the metal. Maximum loads of less than 500 gm/15 mm were observed for aluminum at all temperatures tested, and about 267 gm/15 mm maximum load was observed for steel at a 218° C. sealing temperature for the neat Polybond 3002. The blends of Polybond 3002 with all three polybutylene (Samples No. 2–4) had maximum loads of 536 to 1608 gm/15 mm on aluminum. The blends of Polybond 3002 with PB 0300 and DP 8310 (Samples No. 2 and 4) produced maximum loads of 3000 to 4500 gm/15 mm on steel. The best performance was observed for Sample No. 3, i.e. the blend of Polybond 3002 with PB 8340 on steel. Maximum strength for the blends was in the range of from 4800 to 5600 gm/15 mm.

It was observed from the data in Table 1 that the inventive blend, Samples No. 2, 3, and 4, has and exhibits superior adhesion to metals than the functionalized polypropylene (Sample No. 1). Contrary to the expectations/ teachings of the prior art, the polybutylene appears to synergistically enhance the adhesive capability of the functionalized polypropylene. This phenomenal effect, i.e. from the expectation of a subtractive effect to the observation of synergism was unexpected.

From the observations, we conclude that blending polybutylene with maleated polypropylene, such as Polybond ®, reduces the brittleness and crystallinity of the resulting blend (inventive blend) polymer. The inventive blend has high adhesion to metals and polar polymers, and is more dimensionally stable with changes in temperature.

While this invention has been described in detail for the purpose of illustration, it is not to be construed as limited thereby but is intended to cover all changes and modifications within the spirit and scope thereof.

That which is claimed is:

1. A blend comprising polybutylene and functionalized polyolefins having and exhibiting improved adhesion to metals and polar polymers.

2. A blend comprising polybutylene and functionalized polypropylene having and exhibiting improved adhesion to metals and polar polymers.

3. A blend as in claim 2 wherein said functionalized polypropylene is maleated polypropylene.

4. A blend as in claim 1 wherein said functionalized polyolefin is present in an amount of from about 1–70 wt %.

5. A blend as in claim 2 wherein said maleated polypropylene is present in an amount of from about 5–50 wt %.

6. A blend as in claim 1 wherein said metal is a member of the group consisting of steel and aluminum.

7. A blend as in claim 1 wherein said polar polymer is a member of the group consisting of nylon, PET, and polycarbonates.

8. An article of manufacture comprising the blend of claim 1.

9. An article of manufacture as in claim 8 wherein the blend has been applied by the method of extrusion coating.

10. An article of manufacture as in claim 8 wherein the blend has been applied by the method of lamination.

11. An article of manufacture as in claim 8 wherein the blend has been applied by the method of flame spray coating.

12. An article of manufacture as in claim 8 wherein the blend has been applied by the method of fluidized bed powder coating.

13. An article of manufacture as in claim 8 wherein the blend has been applied by the method of insert injection molding.

14. An article of manufacture as in claim 8 wherein the blend has been applied by the method of rotation molding.

* * * * *